United States Patent
Tanaka

(10) Patent No.: US 8,872,402 B2
(45) Date of Patent: Oct. 28, 2014

(54) TERMINAL CONNECTION FOR A ROTATING ELECTRICAL MACHINE FOR VEHICLE

(71) Applicant: Kazunori Tanaka, Chiyoda-ku (JP)

(72) Inventor: Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/785,110

(22) Filed: Mar. 5, 2013

(65) Prior Publication Data

US 2014/0084711 A1    Mar. 27, 2014

(30) Foreign Application Priority Data

Sep. 25, 2012 (JP) ................. 2012-210347

(51) Int. Cl.
| | |
|---|---|
| H02K 5/22 | (2006.01) |
| H02K 3/52 | (2006.01) |
| H02K 11/00 | (2006.01) |
| H01R 4/34 | (2006.01) |
| H02K 11/04 | (2006.01) |
| H02K 19/36 | (2006.01) |
| H02K 5/14 | (2006.01) |

(52) U.S. Cl.
CPC ............ *H02K 11/0068* (2013.01); *H01R 4/34* (2013.01); *H02K 11/046* (2013.01); *H02K 19/365* (2013.01); *H02K 5/225* (2013.01); *H02K 5/141* (2013.01)
USPC .............. 310/71; 310/43; 310/68 D

(58) Field of Classification Search
CPC ............................ H02K 5/225; H02K 3/522
USPC ...................................... 310/43, 71
See application file for complete search history.

(56) References Cited

U.S. PATENT DOCUMENTS

| | | | |
|---|---|---|---|
| 6,700,194 B2 | 3/2004 | Nakajima et al. | |
| 6,731,030 B2 * | 5/2004 | Keidar et al. | ............... 310/68 D |
| 2002/0043882 A1 * | 4/2002 | Tanaka et al. | ................... 310/71 |
| 2002/0190374 A1 | 12/2002 | Nakajima et al. | |
| 2012/0205993 A1 * | 8/2012 | Tanaka et al. | ................... 310/43 |
| 2013/0257231 A1 * | 10/2013 | Tanaka et al. | ............... 310/68 R |

FOREIGN PATENT DOCUMENTS

JP            4540884 B2     9/2010

* cited by examiner

*Primary Examiner* — Terrance Kenerly
(74) *Attorney, Agent, or Firm* — Sughrue Mion, PLLC

(57) ABSTRACT

In a rotating electrical machine for vehicle, at least one of a rectifier device, a voltage regulator, and a brush holder includes an external terminal connection portion provided with an insert terminal inserted into resin and an insert nut inserted into the resin and superimposed on the insert terminal. The insert terminal includes a contact portion on a surface on a side opposing the insert nut and the insert terminal and the insert nut are superimposed via the contact portion and inserted into the resin. It thus becomes possible to provide a rotating electrical machine for vehicle provided with constituent components that are free from an inconvenience caused by a variance over time.

4 Claims, 8 Drawing Sheets

TERMINAL CONNECTION FOR A ROTATING ELECTRICAL MACHINE FOR VEHICLE

BACKGROUND OF THE INVENTION

1. Field of the Invention

The present invention relates to a rotating electrical machine for vehicle, such as an AC generator for vehicle mounted on a vehicle or the like, and more particularly, to a structure of constituent components thereof.

2. Background Art

Insert nuts to bury metal nuts in screw attachment portions are used for resin molded articles forming automobile components. As a configuration example of a component using the insert nut in the related art, for example, Patent Document 1 discloses a configuration in which a nut is placed on a bottom surface side of an exposed portion of an external connection electrode plate and the nut together with the external connection electrode plate is buried into a resin (for example, PPS) case by transfer molding.

The resin molded articles in the related art are manufactured as is disclosed, for example, in Patent Document 1. That is, a cylindrical pin having a diameter slightly smaller than a diameter of a screw hole of a nut is provided to a tip end of a convex portion of a lower die and the nut to be inserted is placed so as to encircle the pin. A length of the pin is set to a length long enough to slightly protrude from an end face of the nut in a state where the nut encircles the pin. The convex portion of the lower die serves as a portion on which to mount the nut. The convex portion has a cylindrical base portion having a diameter larger than the diameter of the screw hole of the nut and smaller than an outside diameter of the nut. Then, by closing an upper die and the lower die, the nut is fixed as it is sandwiched between the cylindrical base portion and the external connection electrode plate. In this state, molten resin is poured into the dies and resin encapsulation is completed. A resin molded article provided with an insert nut is thus manufactured.

The resin molded article manufactured as above eliminates a need to fix a nut using a tool when a bolt is fastened because the nut is inserted into the resin and therefore makes it easier to fasten a bolt.

CITATION LIST

Patent Document

Patent Document 1: Japanese Patent No. 4540884

During the manufacturing of the resin molded article in the related art disclosed in Patent Document 1, because the nut is sandwiched between the base portion of the lower die and the external connection electrode plate, mold resin is thought to be prevented from coming to an inner side of the nut. However, the nut is a part having a screw portion on the inner side and it is normal that a surface of the nut orthogonal to a direction of a shaft center of the nut is formed without aiming at a high degree of dimensional accuracy. Hence, even when the nut is sandwiched firmly between the base portion of the lower die and the external connection electrode plate, in a case where molten resin is poured into the dies at a high pressure by merely superimposing the surface of the nut that is relatively rough at a not-so-high degree of dimensional accuracy on the external connection electrode plate, because the nut and the external connection electrode plate are not fixed firmly by fixing means, such as caulking, not a little amount of resin may possibly come into a superimposed surface of the surface of the nut and the external connection electrode plate due to a high resin pressure during integral molding.

As is known, the rotating electrical machine, such as an AC generator mounted on a vehicle, is provided with a rectifying device that converts an AC to a DC. The rotating electrical machine for vehicle is used in various severe environments and exposed to high temperature, high humidity, dry air and the like over a long period and resin used for the constituent components deteriorates with time. Hence, with the rotating electrical machine for vehicle in the related art provided with constituent components using resin molded articles formed as above, because unwanted resin is present in the superimposed portion of the insert nut and the external connection electrode plate, a dimension of the superimposed portion of the insert nut and the external connection electrode plate varies with deterioration of the resin. Consequently, the nut is loosened and the loosened nut causes an inconvenience that an electrical connection of the external connection electrode plate cannot be secured. Further, in the case of the resin molded articles in the related art as above, the nut is loosened by vibrations of the AC generator for vehicle. Then, the components can no longer maintain an assembled state and a failure may possibly occur in the rotating generator for vehicle.

SUMMARY OF THE INVENTION

The invention is devised to solve the problems discussed above in the rotating electrical machine of the related art.

A rotating electrical machine for vehicle according to an aspect of the invention includes: a stator provided with a stator winding; a rotor provided with a field winding that generates a flux interlinked with the stator winding and inducing an AC electromotive force in the stator winding when driven to rotate; a rectifier device converting the AC electromotive force to DC power; a voltage regulator regulating magnitude of the induced AC power; and a brush holder holding a brush that supplies a rotor winding of the rotor with a current. At least one of the rectifier device, the voltage regulator, and the brush holder includes an external terminal connection portion provided with an insert terminal inserted into resin and an insert nut inserted into the resin and superimposed on the insert terminal. The insert terminal includes a contact portion on a surface on a side opposing the insert nut and the insert terminal and the insert nut are superimposed via the contact portion and inserted into the resin.

In the rotating electrical machine for vehicle configured as above, at least one of the rectifier device, the voltage regulator, and the brush holder includes the external terminal connection portion provided with the insert terminal inserted into resin and the insert nut inserted into the resin and superimposed on the insert terminal. Also, the insert terminal includes the contact portion on the surface on a side opposing the insert nut and the insert terminal and the insert nut are superimposed via the contact portion and inserted into the resin. Hence, it becomes possible to maintain a contact state of the insert terminal and the insert nut even when the resin deteriorates. Accordingly, because a superimposed dimension of the insert terminal and the insert nut does not vary, there occurs no inconvenience, such as the insert nut becomes loose.

The foregoing and other objects features, aspects, and advantages of the present invention will become more apparent from the following detailed description of the present invention when taken conjunction with the accompanying drawings.

DESCRIPTION OF THE PREFERRED EMBODIMENTS

First Embodiment

Figure 1:
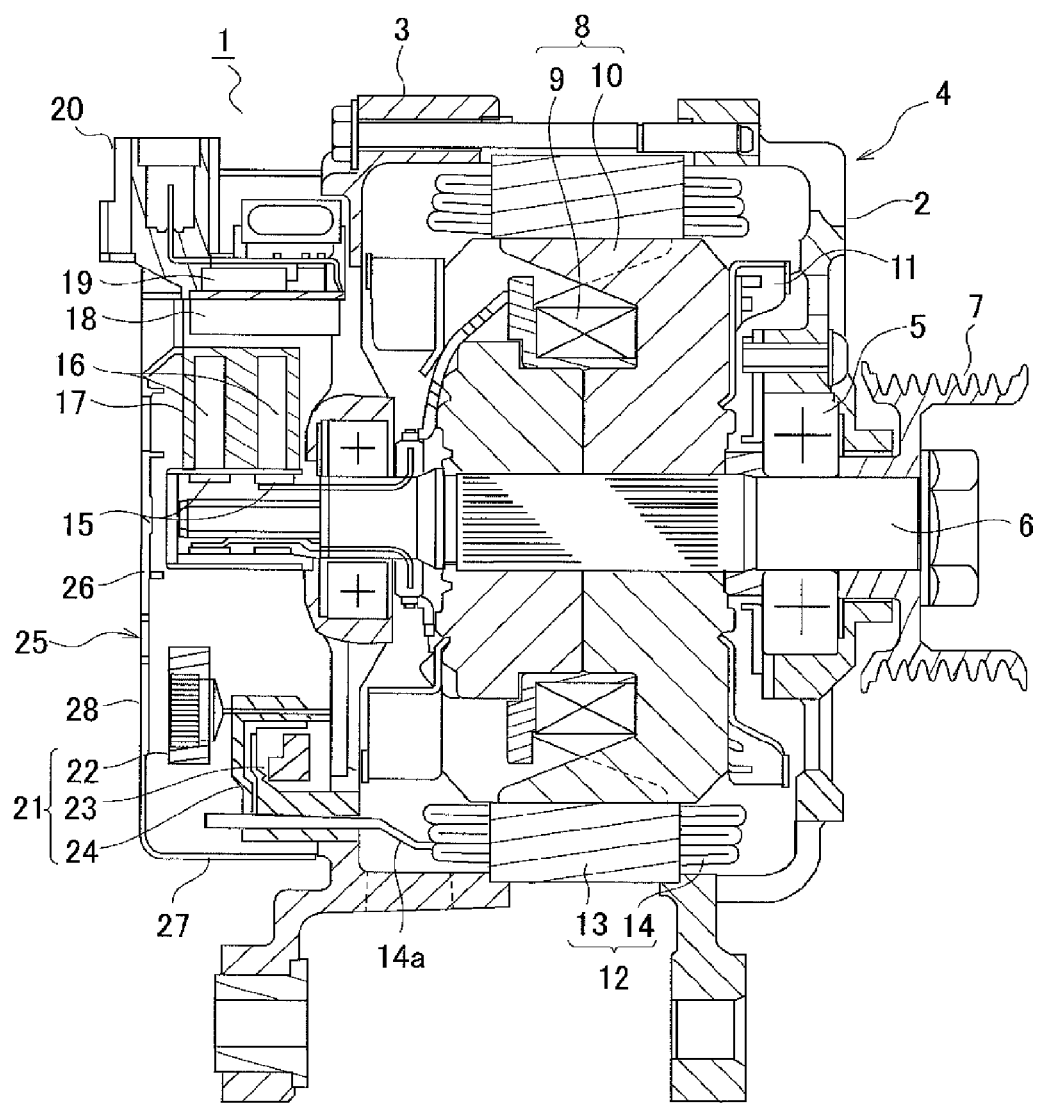
FIG. 1 is a sectional side view of a rotating electrical machine for vehicle according to a first embodiment of the invention.
Figure 2:
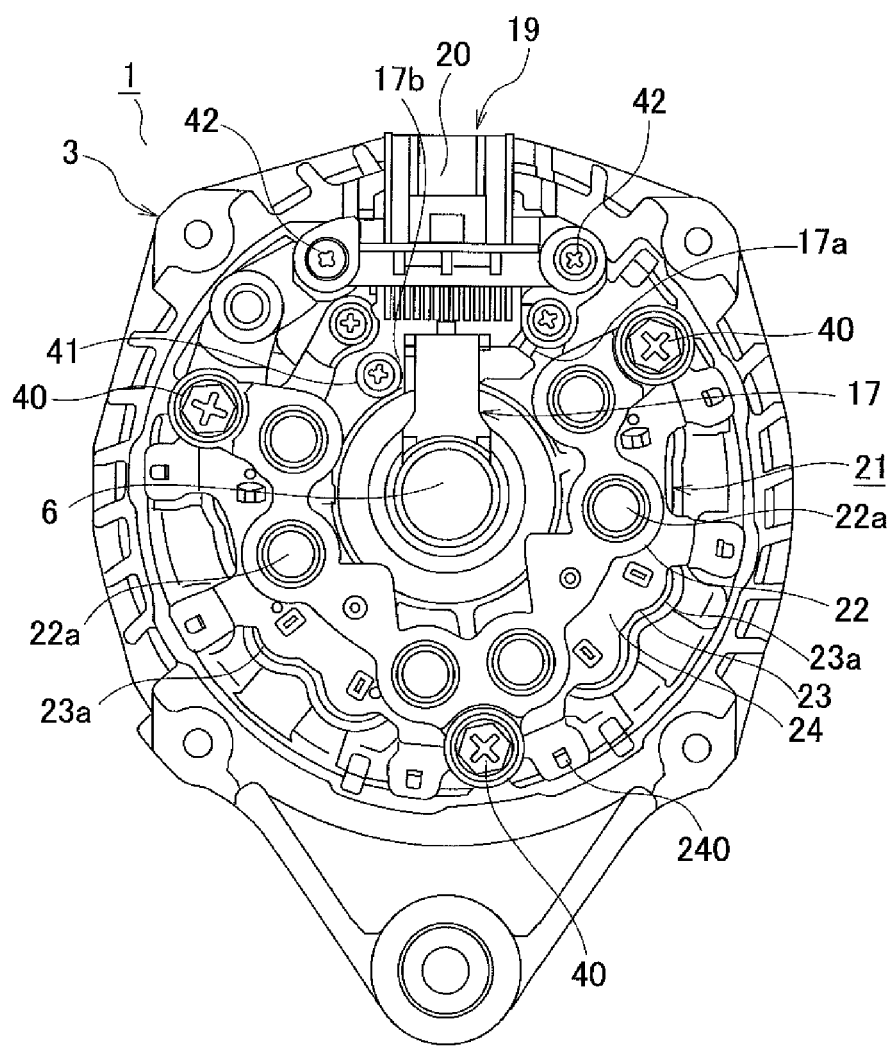
FIG. 2 is a plan view of the rotating electrical machine for vehicle according to the first embodiment of the invention showing one end in an axial direction in a state where a rear cover is removed.

Hereinafter, a rotating electrical machine for vehicle according to a first embodiment of the invention will be described. The rotating electrical machine for vehicle according to the first embodiment of the invention described below is formed as a three-phase AC generator for vehicle. FIG. 1 is a sectional side view of the rotating electrical machine for vehicle according to the first embodiment of the invention. FIG. 2 is a plan view of the rotating electrical machine for vehicle according to the first embodiment of the invention showing one end in an axial direction in a state where a rear cover is removed.

Referring to FIG. 1 and FIG. 2, an AC generator 1 for vehicle includes a casing 4 formed of a front bracket 2 and a rear bracket 3 each shaped like substantially a bowl and made of aluminum, a shaft 6 supported on the casing 4 in a rotatable manner via a pair of bearings 5, a pulley 7 firmly fixed to the shaft 6 at one axial end protruding toward a front side of the casing 4, a rotor 8 fixed to the shaft 6 and provided inside the casing 4, a pair of fans 11 fixed to respective axial end faces of the rotor 8, and a stator 12 fixed to the casing 4 so as to surround the rotor 8.

The rotating electrical machine for vehicle according to the first embodiment of the invention further includes a pair of slip rings 15 fixed to the shaft 6 in an extended portion extending toward a rear side of the casing 4 and supplying the rotor 8 with a current, a pair of brushes 16 in sliding contact with surfaces of the respective slip rings 15, a brush holder 17 in which to house these brushes 16, a voltage regulator 19 attached to a heat sink 18 provided on an outer diameter side of the rear bracket 3 with respect to the brush holder 17 and regulating magnitude of an AC voltage generated in a stator winding 14 provided to the stator 12 and described below, a connector 20 molded integrally with an attachment portion of the heat sink 18 and outputting a signal from the voltage regulator 19 to an outside device (not shown), such as a battery, and inputting a signal from the latter into the former, a rectifier device 21 provided on a rear side of the rear bracket 3 and converting an AC electromotive force generated in the stator 12 to a DC output voltage, and a protection cover 25 attached to the rear bracket 3 so as to cover the brush holder 17, the voltage regulator 19, and the rectifier device 21.

The rotor 8 is a Lundell-type rotor and includes a field winding 9 that generates a flux when an excitation current is flown and a pole core 10 provided so as to cover the field winding 9 and forming a magnetic pole with the flux. The stator 12 includes a cylindrical stator iron core 13 and a stator winding 14 wound around the stator iron core 13 and inducing an AC electromotive force due to a variance of the flux from the field winding 9 in association with rotations of the rotor 8. The stator winding 14 is formed of first and second three-phase stator windings that are two independent windings out of phase by 30 [deg]. The stator iron core 13 of the stator 12 provided so as to surround the rotor 8 is sandwiched between opening ends of the front bracket 2 and the rear bracket 3 and fastened by a plurality of bolts from both axial ends via the front bracket 2 and the rear bracket 3. The stator iron core 13 is therefore pinched by the front bracket 2 and the rear bracket 3.

The rectifier device 21 includes, as will be described below, a substantially C-shaped positive-electrode-side heat sink 22 on which are mounted six positive-electrode-side rectifier elements 22a, a substantially C-shaped negative-electrode-side heat sink 23 on which are mounted six negative-electrode-side rectifier elements 23a, and a substantially C-shaped circuit board 24. The positive-electrode-side heat sink 22 and the negative-electrode-side heat sink 23 are placed one on top of the other with the circuit board 24 in between and, as is shown in FIG. 2, provided on the periphery of the shaft 6 so that both open ends of the C shape are positioned on the upper side of FIG. 2 and fixed to the rear bracket 3.

The positive-electrode-side rectifier elements 22a are disposed on the positive-electrode-side heat sink 22 shown in FIG. 2. The negative-electrode-side rectifier elements 23a are disposed on the negative-electrode-side heat sink 23 shown in FIG. 2. The positive-electrode-side rectifier elements 22a and the negative-electrode-side rectifier elements 23a are connected so as to form two three-phase bridge circuits via the circuit board 24. AC-side terminal of the three-phase bridge circuits are connected to leads line of the three-phase stator windings.

Positive-electrode-side DC terminals of the two three-phase bridge circuits are connected commonly via the positive-electrode-side heat sink 22 and connected to a positive-electrode-side terminal of an in-vehicle battery (not shown).

The rectifier device 21 configured as above is disposed about the shaft 6 on a plane orthogonal to the shaft center of the shaft 6 on an outer circumferential side of the slip rings 15. The positive-electrode-side heat sink 22, the circuit board 24, and the negative-electrode-side heat sink 23 forming the rectifier device 21 are placed one on top of another to form a single piece that is fixedly fastened to an outer end face of the rear bracket 3 with three screws 40. The lead line 14a of the three-phase stator winding forming the stator winding 14 is pulled out from the rear bracket 3 and connected to six winding lead line connection terminals 240 described below and provided to the circuit board 24 in an outer peripheral portion.

The lead lines of the three-phase stator windings are connected to the three-phase bridge circuits at respective predetermined positions via a conductor inserted into the circuit board 24.

The brush holder 17 is disposed between open tip ends of the substantially C-shaped rectifier device 21 and fixedly fastened to the outer end face of the rear bracket 3 with screws 41. A pair of brush connection conductors 17a and 17b provided to the brush holder 17 is electrically connected to a pair of the brushes 16. The voltage regulator 19 is disposed between open tip ends of the substantially C-shaped rectifier device 21 on the outer diameter side of the rear bracket 3 with respect to the brush holder 17 and fixedly fastened to the outer end face of the rear bracket 3 with two screws 42. A positive-electrode-side terminal of the voltage regulator 19 is connected to an external terminal connection portion 244 of the circuit board 24 as will be described below.

Figure 3:
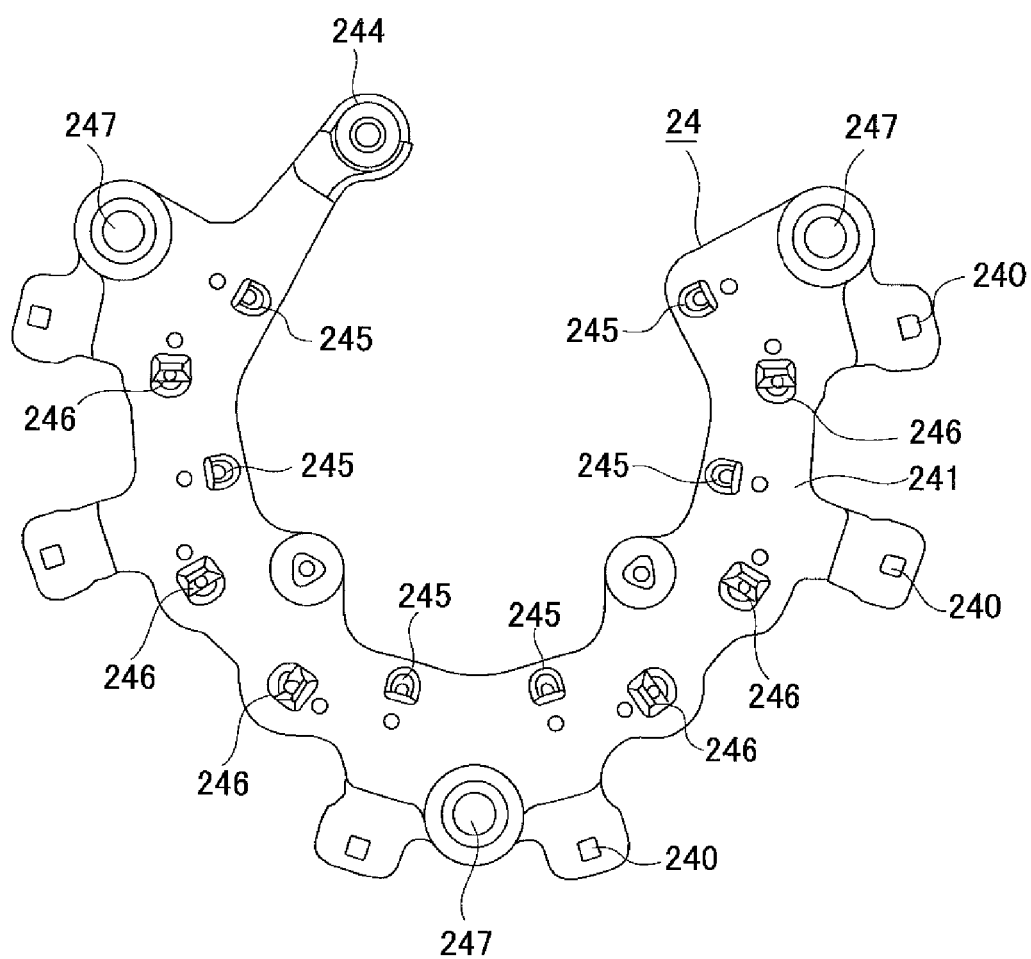
FIG. 3 is a plan view showing a circuit board of a rectifier device in the rotating electrical machine for vehicle according to the first embodiment of the invention.

The circuit board 24 will now be described. FIG. 3 is a plan view showing the circuit board of the rectifier device in the rotating electric machine for vehicle according to the first embodiment of the invention. As is shown in FIG. 3, the circuit board 24 is shaped like substantially a capital C as with the positive-electrode-side heat sink 22 and the negative-electrode-side heat sink 23, and as has been described above, interposed between the positive-electrode-side heat sink 22 and the negative-electrode-side heat sink 23. The circuit board 24 includes the external terminal connection portion 244 having an insert terminal 26 inserted into an insulating board 241 molded from resin and an insert nut 27 inserted into the insulating board 241.

Also, the circuit board 24 includes the six winding lead line connection terminals 240 provided to the outer peripheral portion, six positive-electrode-side rectifier element connection terminals 245 connected to the respective six positive-electrode-side rectifier elements 22a described above, six negative-electrode-side rectifier element connection terminals 246 connected to the respective six negative-electrode rectifier elements 23a described above, and three screw through-holes 247 to let the respective three screws 40 pass through.

Figure 4A:
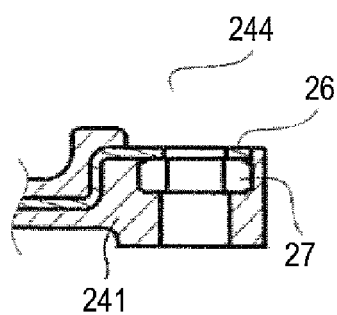
FIG. 4A and FIG. 4B are cross sections used to describe an external terminal connection portion of the circuit board in the rotating electrical machine for vehicle according to the first embodiment of the invention.
Figure 4B:
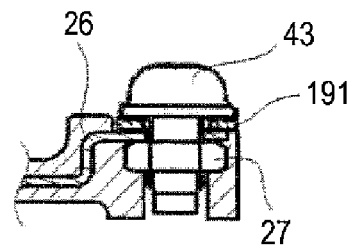

The external terminal connection portion 244 of the circuit board 24 will now be described. FIGS. 4A and 4B are cross sections used to describe the external terminal connection portion of the circuit board in the rotating electric machine for vehicle according to the first embodiment of the invention. FIG. 4A is a cross section used to describe the external terminal connection portion of the circuit board and FIG. 4B is a cross section used to describe a state where an external electrode is connected to the external terminal connection portion of the circuit board. As is shown in FIG. 4A, the external terminal connection portion 244 of the circuit board 24 includes the insert terminal 26 inserted into the insulating board 241 and the insert nut 27 inserted into the insulating board 241 below the insert terminal 26.

As is shown in FIG. 4B, a positive-electrode-side terminal 191 of the voltage regulator 19 is superimposed on the insert terminal 26 in the external terminal connection portion 244 of the circuit board 24 and electrically and mechanically connected to the insert terminal 26 by a screw 43 threaded into the insert nut 27.

Figure 5A:
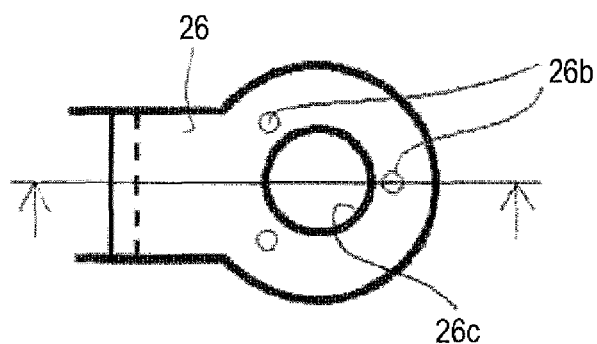
FIG. 5A, FIG. 5B, and FIG. 5C are views showing a disassembled state and used to describe the external terminal connection portion of the circuit board in the rotating electrical machine for vehicle according to the first embodiment of the invention.
Figure 5B:
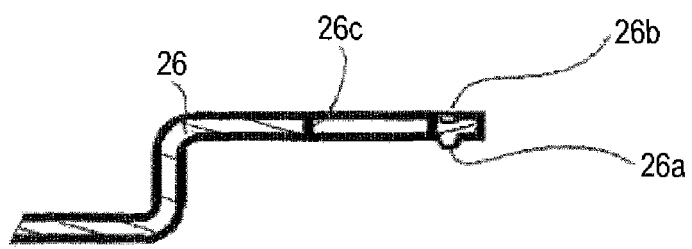
Figure 5C:

FIGS. 5A through 5C are views showing a disassembled state and used to describe the external terminal connection portion of the circuit board in the rotating electrical machine for vehicle according to the first embodiment of the invention. FIG. 5A is a plan view of the insert terminal. FIG. 5B is a cross section of the insert terminal taken on the line A-A of FIG. 5A. FIG. 5C is a cross section of the insert nut. As are shown in FIGS. 5A and 5B, the insert terminal 26 is provided with a through-hole 26c to let the screw 43 pass through and three spherical contact portions 26a formed apart from one another on the periphery of the through-hole 26c.

The contact portions 26a are formed, for example, by pressing work so as to protrude from the surface of the insert terminal 26 on the side opposing the surface of the insert nut 27. In a case where the contact portions 26a are provided to the insert terminal 26 by pressing work, concave portions 26b as a result of punching out the contact portions 26a by pressing are formed in the insert terminal 26. The contact portions 26a of a protruding shape can be formed by press molding at the same time as a step of punching out the insert terminal 26 from a plate-like conductor. Hence, the contact portions 26a can be formed without any extra cost.

It should be appreciated that the contact portions 26a are not limited to the configuration shown in FIGS. 5A through 5C. Contact portions of a protruding shape alone may be provided by omitting the concave portions 26b. Alternatively, other configurations, such as a convex shape other than a spherical shape and a toroidal shape, may be selected suitably. Also, it goes without saying that the number and locations of the contact portions 26a are not limited to those specified above.

By integrally molding the contact portions 26a provided to the insert terminal 26 with resin when the circuit board 24 is molded from resin by sandwiching the superimposed insert terminal 26 and insert nut 27 between unillustrated upper and lower molding dies and by actively pressing the contact portions 26a provided to the insert terminal 26 against the surface of the insert nut 27, the contact portions 26a ensure contact between the insert terminal 26 and the insert nut 27 and determine a final superimposed dimension of the insert terminal 26 and the insert nut 27.

As has been described, the positive-electrode-side terminal 191 of the voltage regulator 19 is, as is shown in FIG. 4B, placed on the insert terminal 26 exposed in the external terminal connection portion 244 of the circuit board and integrally connected to the insert terminal 26 electrically and mechanically with the screw 43 threaded into the insert nut 27.

Second Embodiment

Figure 6A:
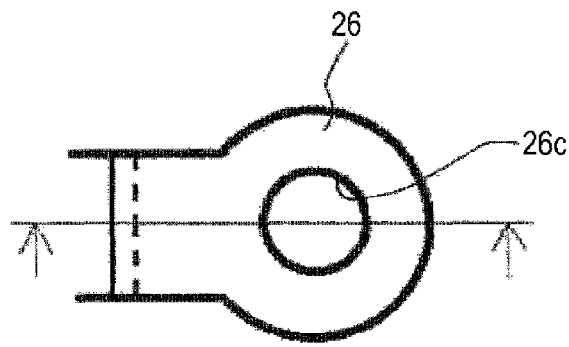
FIG. 6A, FIG. 6B, and FIG. 6C are views showing a disassembled state and used to describe an external terminal connection portion of a circuit board in a rotating electrical machine for vehicle according to a second embodiment of the invention.
Figure 6B:
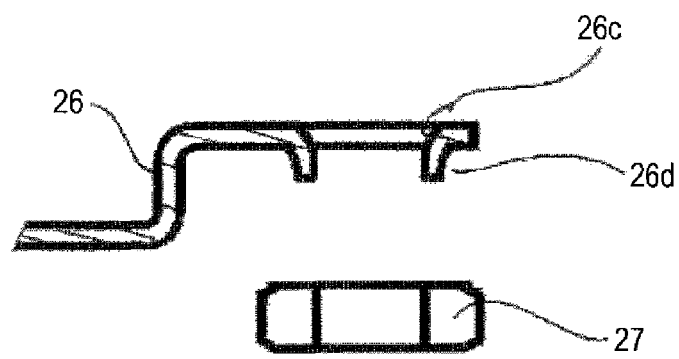
Figure 6C:

FIGS. 6A through 6C are views showing a disassembled state and used to describe an external terminal connection portion of a circuit board in a rotating electrical machine for vehicle according to a second embodiment of the invention. FIG. 6A is a plan view of an insert terminal. FIG. 6B is a cross section of the insert terminal taken on the line A-A of FIG. 6A. FIG. 6C is a cross section of an insert nut. The second embodiment shown in FIGS. 6A through 6C is configured in such a manner that the insert terminal 26 is provided with a contact portion 26d formed along a peripheral rim portion of the through-hole 26c to let the screw 43 pass through. The contact portion 26d is formed of a burr provided as a result of punching out the through-hole 26c in the insert terminal 26. Hence, there is no need for an extra step of forming the contact portion 26d.

Although the contact portion 26d shown in FIG. 6B is enlarged, it is only necessary for the contact portion 26d to protrude like a burr and the contact portion 26d is not necessarily shaped like a ring. As has been described above, by integrally molding the contact portion 26d with resin during the resin molding by sandwiching the superimposed insert terminal 26 and insert nut 27 between the upper and lower molding dies and by actively pressing the contact portion 26d against the surface of the insert nut 27, the contact portion 26*d* ensures contact between the insert terminal 26 and the insert nut 27 and determines a final superimposed dimension of the insert terminal 26 and the insert nut 27.

Figure 7:
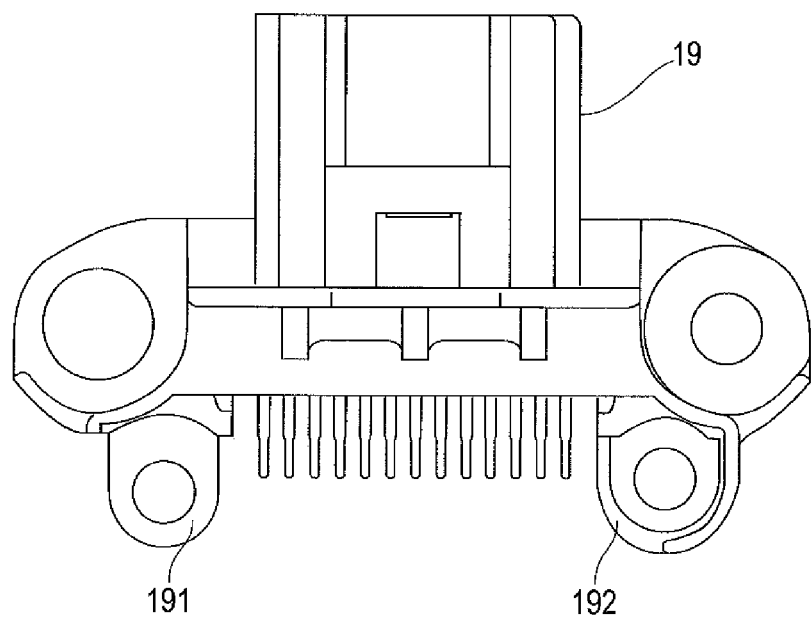
FIG. 7 is a plan view of a voltage regulator applicable to the rotating electrical machine of the invention.
Figure 8:
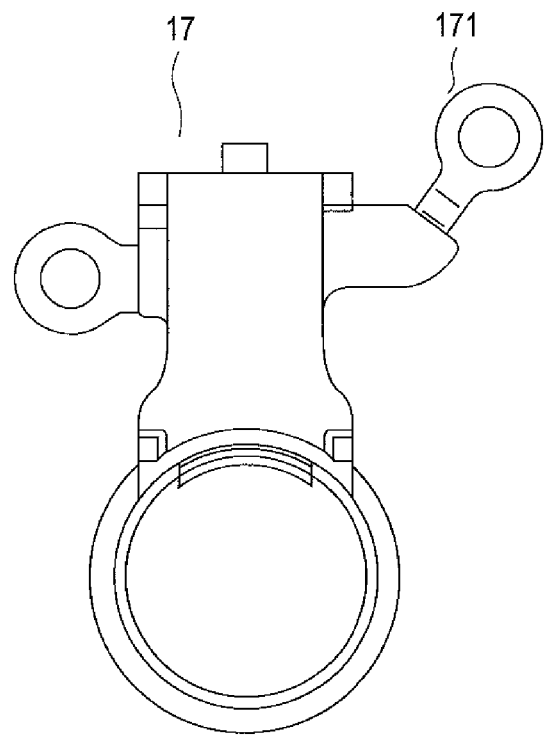
FIG. 8 is a plan view of a brush holder applicable to the rotating electrical machine of the invention.

The first and second embodiments of the invention above have described the rotating electrical machine for vehicle particularly in a case where the rotating electrical machine for vehicle is applied to the external terminal connection portion of the rectifier device. However, it goes without saying that the rotating electrical machine for vehicle of the invention can be also applied to external terminal connection portions 191 and 192 of the voltage regulator 19 as a constituent component of an AC generator for vehicle shown in FIG. 7 and to an external terminal connection portion 171 of the brush holder 17 as a constituent component of an AC generator for vehicle shown in FIG. 8.

Various modifications and alterations of this invention will be apparent to those skilled in the art without departing from the scope and spirit of this invention, and it should be understood that this is not limited to the illustrative embodiments set forth herein.

What is claimed is:

1. A rotating electrical machine for vehicle, comprising:
   a stator provided with a stator winding;
   a rotor provided with a field winding that generates a flux interlinked with the stator winding and inducing an AC electromotive force in the stator winding when driven to rotate;
   a rectifier device converting the AC electromotive force to DC power;
   a voltage regulator regulating magnitude of the induced AC power; and
   a brush holder holding a brush that supplies a rotor winding of the rotor with a current,
   wherein:
   at least one of the rectifier device, the voltage regulator, and the brush holder includes an external terminal connection portion provided with an insert terminal inserted into resin and an insert nut inserted into the resin and superimposed on the insert terminal;
   the insert terminal includes a contact portion on a surface on a side opposing the insert nut;
   the insert terminal and the insert nut are superimposed via the contact portion and inserted into the resin; and
   the contact portion provided to the insert terminal is formed of a protrusion protruding toward the insert nut.

2. The rotating electrical machine for vehicle according to claim 1, wherein:
   an external terminal to be connected to the external terminal connection portion is superimposed on the insert terminal in a superimposed portion of the internal terminal and the insert nut and electrically and mechanically connected to the insert terminal with a screw threaded into the insert nut.

3. The rotating electrical machine for vehicle according to claim 1, wherein:
   the contact portion includes a plurality of contact portions that are formed apart from one another on a periphery of a through-hole provided to the insert terminal to let a screw pass through.

4. The rotating electrical machine for vehicle according to claim 1, wherein:
   the contact portion is formed of a burr formed along a peripheral rim portion of a through-hole provided to the insert terminal to let a screw pass through.

* * * * *